United States Patent
Cook (10) Patent No.: US 6,664,967 B1
(45) Date of Patent: Dec. 16, 2003

(54) APPARATUS TO DETECT SETTING OF BITS IN A DATA STRUCTURE

(75) Inventor: Russell S. Cook, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,174

(22) Filed: May 18, 2000

(51) Int. Cl.[7] ................................................ G06T 1/20
(52) U.S. Cl. ........................ 345/506; 345/522; 708/203; 708/212
(58) Field of Search ................................. 345/501, 503, 345/506, 522, 556, 563; 708/200, 203, 210, 212

(56) References Cited

U.S. PATENT DOCUMENTS

| | | | | |
|---|---|---|---|---|
| 5,420,809 A | * | 5/1995 | Read et al. ................. | 708/200 |
| 5,541,865 A | * | 7/1996 | Ashkenazi .................. | 708/210 |
| 5,717,616 A | * | 2/1998 | Morris ........................ | 708/210 |
| 6,018,353 A | * | 1/2000 | Deering et al. ............. | 345/537 |
| 6,307,557 B1 | * | 10/2001 | Deering ...................... | 345/428 |
| 6,314,205 B1 | * | 11/2001 | Masuda et al. ............. | 382/232 |
| 6,337,689 B1 | * | 1/2002 | Hochmuth et al. ......... | 345/522 |

OTHER PUBLICATIONS

The OpenGL Graphics System: A Specification (Version 1.2); Segal et al.; Mar. 23, 1998.

* cited by examiner

Primary Examiner—Ulka J. Chauhan
(74) Attorney, Agent, or Firm—Duke W. Yee; Mark E. McBurney; Lisa L. B. Yociss (57) ABSTRACT

A method and apparatus for detecting bits set in a data structure. A first level encoding stage receives bits for the data structure, groups the bits into a set of bit groups, and encodes the set of bit groups to form a set of output bits. A set of intermediate level encoding stages is connected to the first level encoding stage. Each level intermediate encoding stage receives output bits from a previous stage, groups the output bits into a plurality of bit groups, and encodes the plurality of bit groups to generate a plurality of output bits. A final level encoding stage is connected to a last intermediate level encoding stage within the set of intermediate level encoding stages, wherein the final level encoding receives final output bits from a last intermediate level encoding stage within the plurality of intermediate level encoding stages and encodes the final output bits to generate an indication of bits set in the data structure.

20 Claims, 6 Drawing Sheets

| 0 | 7 | 8 | | | | | | 15 | 16 | | | | | | 23 | 24 | | | | | | | 31 | |
|---|---|---|---|---|---|---|---|---|---|---|---|---|---|---|---|---|---|---|---|---|---|---|---|---|
| c | c | c | c | c | c | c | c | – | – | L | L | L | L | L | L | L | L | L | L | L | L | L | L | Command |
| e | e | e | e | e | e | e | e | e | e | e | e | e | e | e | e | e | e | e | e | e | e | e | 0 | efield |
| – | – | – | – | – | – | – | – | F | R | – | – | – | – | – | – | – | – | – | – | – | – | – | – | 31:reserved |
| x | x | x | x | x | x | x | x | x | x | x | x | x | x | x | x | x | x | x | x | x | x | x | x | 30:xcoordinate |
| y | y | y | y | y | y | y | y | y | y | y | y | y | y | y | y | y | y | y | y | y | y | y | y | 29:ycoordinate |
| z | z | z | z | z | z | z | z | z | z | z | z | z | z | z | z | z | z | z | z | z | z | z | z | 28:zcoordinate |
| w | w | w | w | w | w | w | w | w | w | w | w | w | w | w | w | w | w | w | w | w | w | w | w | 27:wcoordinate |
| x | x | x | x | x | x | x | x | x | x | x | x | x | x | x | x | x | x | x | x | x | x | x | x | 26:Auxiliaryxcoordinate |
| y | y | y | y | y | y | y | y | y | y | y | y | y | y | y | y | y | y | y | y | y | y | y | y | 25:Auxiliaryycoordinate |
| z | z | z | z | z | z | z | z | z | z | z | z | z | z | z | z | z | z | z | z | z | z | z | z | 24:Auxiliaryzcoordinate |
| w | w | w | w | w | w | w | w | w | w | w | w | w | w | w | w | w | w | w | w | w | w | w | w | 23:Auxiliarywcoordinate |
| – | – | – | – | – | – | – | – | – | – | – | – | – | – | – | – | – | – | – | – | – | – | – | f | 22:flag |
| S | S | S | S | S | S | S | S | S | S | S | S | S | S | S | S | S | S | S | S | S | S | S | S | 21:S0texturecoordinate |
| T | T | T | T | T | T | T | T | T | T | T | T | T | T | T | T | T | T | T | T | T | T | T | T | 20:T0texturecoordinate |
| R | R | R | R | R | R | R | R | R | R | R | R | R | R | R | R | R | R | R | R | R | R | R | R | 19:R0texturecoordinate |
| Q | Q | Q | Q | Q | Q | Q | Q | Q | Q | Q | Q | Q | Q | Q | Q | Q | Q | Q | Q | Q | Q | Q | Q | 18:Q0texturecoordinate |

| INPUT | | | | OUTPUT |
|---|---|---|---|---|
| 0000 | | | | 00 |
| 0001 | 0010 | 0100 | 1000 | 01 |
| 0111 | 1011 | 1101 | 1111 | 11 |
| ALL OTHERS | | | | 10 |

| INPUT | | | OUTPUT |
|---|---|---|---|
| 0000 | | | 00 |
| 0001 | 0100 | | 01 |
| 0010 | 0101 | 1000 | 10 |
| ALL OTHERS | | | 11 |

| INPUT | OUTPUT |
|---|---|
| 11 | 1 |
| ALL OTHERS | 0 |

1002     1004

APPARATUS TO DETECT SETTING OF BITS IN A DATA STRUCTURE

BACKGROUND OF THE INVENTION

1. Technical Field

The present invention relates generally to an improved data processing system and in particular to a method and apparatus for processing graphics data. Still more particularly, the present invention relates to a method and apparatus for identifying receipt of a complete graphics data stream.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, an arc, a cone, or a sphere. A primitive is defined by a group of one or more vertices. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

Within these graphics systems, a graphics pipeline is used to process this graphics data. With a pipeline, the graphics data processing is partitioned into stages of processing elements in which processing data may be executed sequentially by separate processing elements. The first stage in the graphics pipeline is typically a vertex packer, which is used to accumulate data for a vertex prior to sending the vertex to the other stages for processing. A data stream is received by the vertex packer for processing. The amount of data that may be received in a data stream for a vertex is variable in many cases. The data stream begins with a command containing two 32 bit words. The first word contains the opcode and a count of a number of vertices to follow. The second word in the command contains a set of 32 enable bits. These enable bits identify the number of words containing vertex data. Following the command is a number of words containing the vertex data.

It is necessary to know when the variable length data stream is complete for a single vertex. When up to 32 words are to be received for a vertex, the use of a 32 bit counter to count the enable bits impedes performance because a 32 bit counter function cannot be performed in a single clock cycle. Currently, identification of whether additional words are to be received is performed by counting the number of bits set equal to a logic one in the 32 bit word and decrementing the count each time a new data word is received. This current process requires a large and slow circuit containing a counter, which is unable to perform the function in a single clock cycle.

Therefore, it would be advantageous to have an improved method and apparatus for identifying when all of the data for a vertex has been received.

SUMMARY OF THE INVENTION

The present invention provides a method and apparatus for detecting bits set in a data structure. A first level encoding stage receives bits for the data structure, groups the bits into a set of bit groups, and encodes the set of bit groups to form a set of output bits. A set of intermediate level encoding stages is connected to the first level encoding stage. Each level intermediate encoding stage receives output bits from a previous stage, groups the output bits into a plurality of bit groups, and encodes the plurality of bit groups to generate a plurality of output bits. A final level encoding stage is connected to a last intermediate level encoding stage within the set of intermediate level encoding stages, wherein the final level encoding receives final output bits from a last intermediate level encoding stage within the plurality of intermediate level encoding stages and encodes the final output bits to generate an indication of bits set in the data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
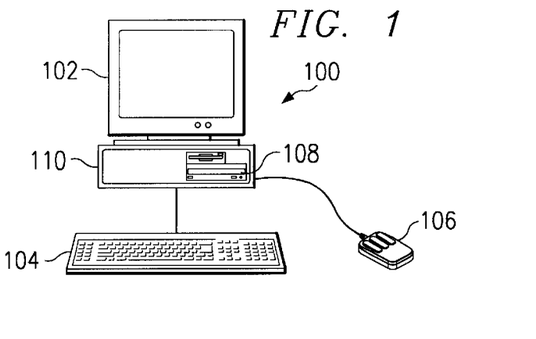
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
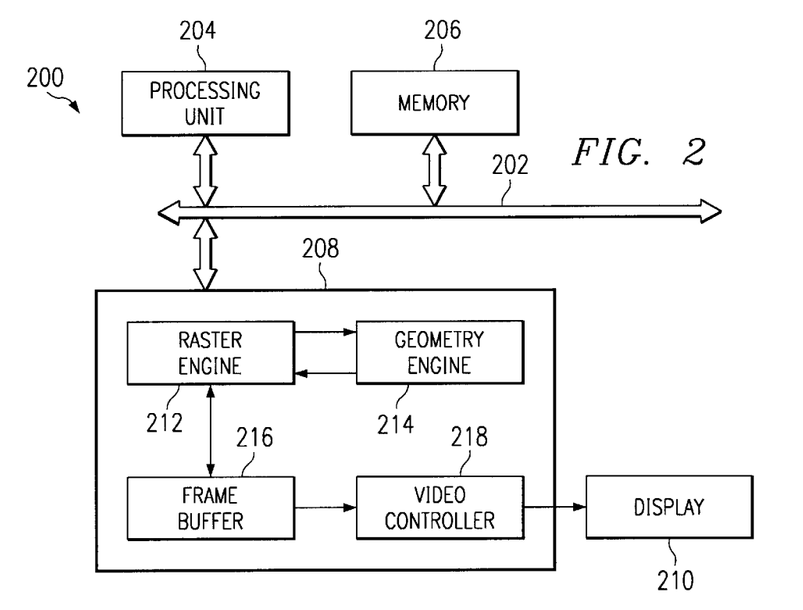
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures such as Accelerated Graphics Port (AGP) and Industry Standard Architecture (ISA) may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bit map image while it is "painted" on a screen. Video controller 218 takes the data in frame buffer 216 and generates a display on display 210. Typically, video controller 218 will cycle through frame buffer 216 one scan line at a time.

Figure 3:
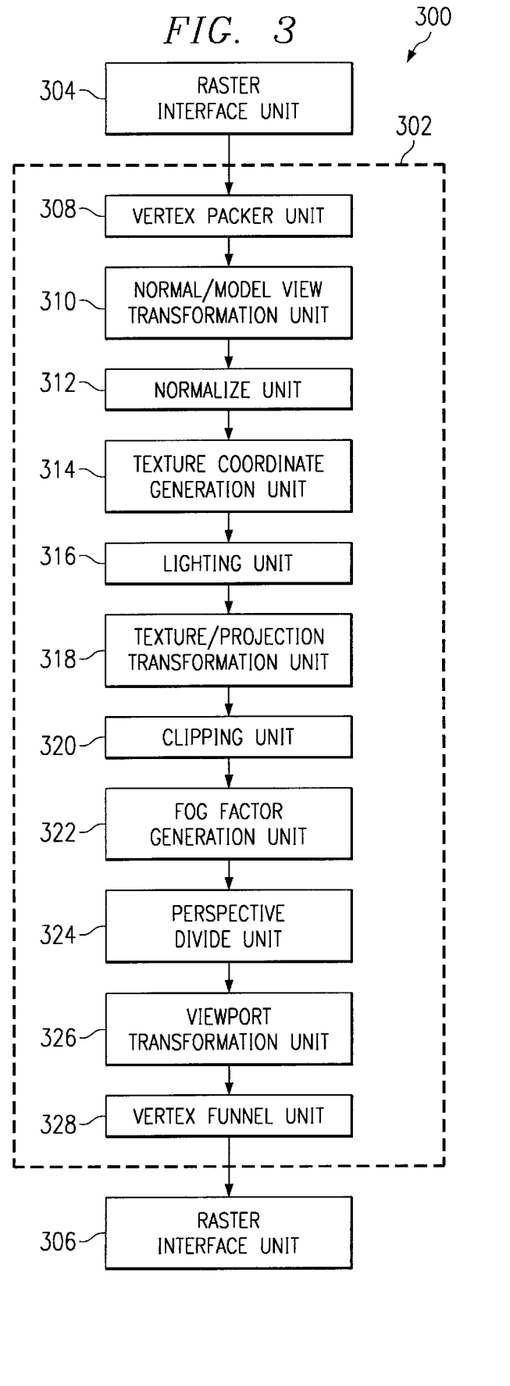
FIG. 3 is a block diagram of a geometry engine in accordance with a preferred embodiment of the present invention.

Turning now to FIG. 3, a block diagram of a geometry engine is depicted in accordance with a preferred embodiment of the present invention. Geometry engine 300, in this example, includes a geometry unit 302, a raster interface unit 304, and a raster interface unit 306. Data is received by raster interface unit 304 for processing within geometry unit 302. The data is received from a raster engine, such as raster engine 210 in FIG. 2. Processed data is returned to the raster engine using raster interface unit 306. The mechanism of the present invention is implemented within the processing elements in geometry unit 302. Specifically, the processing elements implement equations in hardware to process graphics data. The mechanism of the present invention reduces the complexity of the hardware by optimizing the equations in a simpler form and implementing these simplified equations in the processing elements.

Geometry unit 302, in this example, is a graphics pipeline containing a set of processing elements, which include a vertex packer unit 308, a normal/model view transformation unit 310, a normalize unit 312, a texture coordinate generation unit 314, a lighting unit 316, a texture/projection transformation unit 318, a clipping unit 320, a fog factor generation unit 322, a perspective divide unit 324, a viewport transformation unit 326, and a vertex funnel unit 328.

Vertex packer unit 308 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal/model view transformation unit 310 is used to transform object coordinates into the world-coordinate system. XYZ vertices, normals, and texture coordinates are transformed before their coordinates are used to produce an image in the frame buffer. This function is performed by transforming the vertices of each polygon with a single transformation matrix that is the concatenation of the individual modeling transformation matrices.

Normalize unit 312 performs normalization function of vertices that have been transformed. Places each vertex back into a normal with reference to a single decimal point. In other words, the normalize unit removes any skewing caused by matrix multiplication in normal/model view transformation unit 310. Texture coordinate generation unit 314 generates texture coordinates used for displaying texture for a primitive. Texture coordinate generation unit 314 calculates texture values for each texture coordinate by transforming from one coordinate system into one required for the texture coordinate. Texture coordinates associated with a vertex may either be taken from the current texture coordinates or generated according to a function dependent on vertex coordinates.

Lighting unit 316 computes shading and colors for each vertex. The lighting unit applies lighting models or shading models to a vertex, which may take into account factors, such as ambient light, diffuse reflection, and specular reflection. The shading may be determined using various processes, such as constant, Gouraud, or Phong. Texture/projection transformation unit 318 changes the form or shape of a primitive.

Clipping unit 320 identifies a portion of a tprimitive lying within a clip region. A clip region is typically either a window on a screen or a view volume. Fog factor generation unit 322 is used to make an object less visible as it is further away from the viewpoint. Typically, mist is generated in front of the object as the object is located further and further away from the viewpoint.

Perspective divide unit 324 is used to generate normalized device coordinates from the incoming coordinates. This unit takes coordinates from fog factor generation unit 322 and divides them by w to generate normalized device coordinates for use by viewpoint transformation unit 326. Viewpoint transformation unit 326 takes primitives in normalized device coordinates and transforms them to window coordinates. Device coordinates are coordinates used by the adaptee to display images. Normalized device coordinates are device coordinates that are normalized to between 0 and 1.

Vertex funnel unit 328 takes fragments of vertices and places them on a bus for use by the raster interface unit. In this example, the fragments are funneled into a 64-bit data word for transfer on the bus.

The present invention provides an improved method an apparatus for identifying when all of the data for a vertex has been received by a vertex packer unit, such as vertex packer unit 308 in FIG. 3. The mechanism of the present invention identifies when all of the data for a vertex has been received without using a counter. In this manner, this detection function may be performed without degrading the performance in the geometry engine. The mechanism of the present invention provides this advantage by performing a series of encoding, resulting in a single bit indicating whether additional data is to be received for the vertex.

Figure 4:
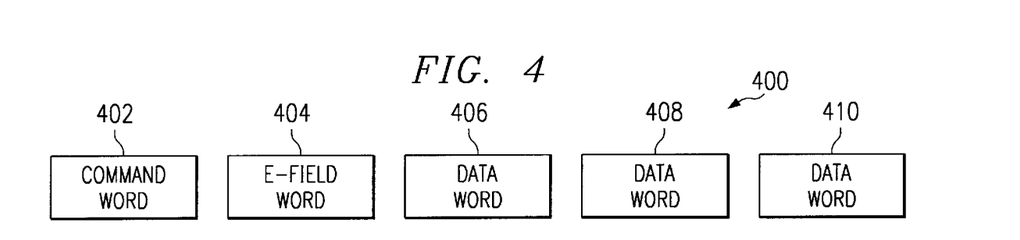
FIG. 4 is a diagram illustrating a data stream containing graphics data for a vertex in accordance with a preferred embodiment of the present invention.

Turning next to FIG. 4, a diagram illustrating a data stream containing graphics data for a vertex is depicted in accordance with a preferred embodiment of the present invention. Data stream 400 is an example of a data stream received at a vertex packer unit, such as vertex packer unit 300 in FIG. 3. In these examples, data is received by the vertex packer unit two words at a time. Command word 402 and e-field word 404 are the first two words received by the vertex packer unit. After that, data words, such as data words 406, 408 and 410 are received two words at a time. In this example, e-field word 404 will have a number of bits set to indicate the number of data words that are to be received. In this example, only 3 bits in the 32 bit word will be set.

Figure 5A:
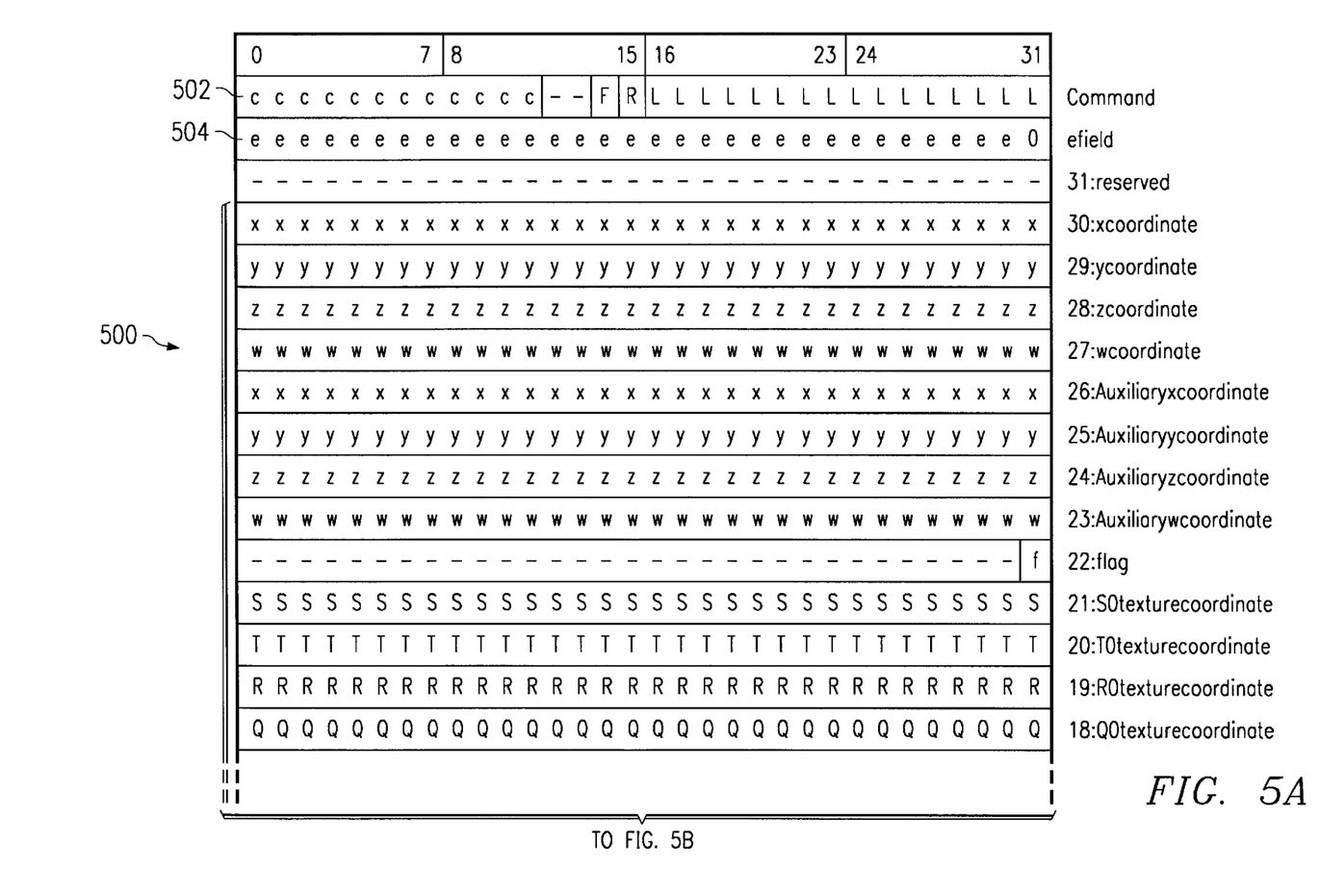
FIGS. 5A and 5B, depicts a is diagram illustrating the format for a vertex data stream in accordance with a preferred embodiment of the present invention.
Figure 5B:
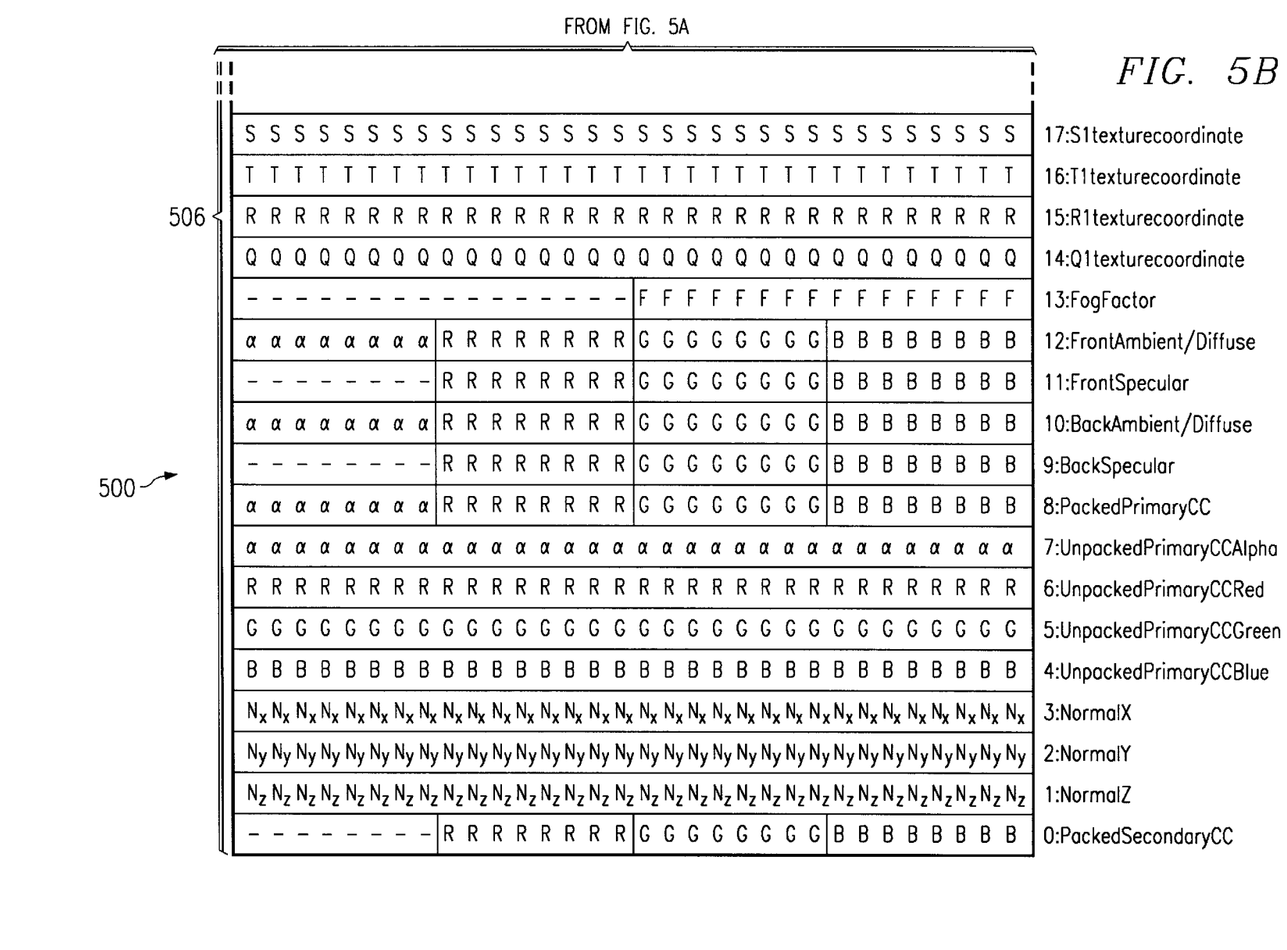

Turning now to FIGS. 5A and 5B, a diagram illustrating the format for a vertex data stream is depicted in accordance with a preferred embodiment of the present invention. Table 500 illustrates the different types of words that may be received and processed. Entry 502 illustrates the fields found in a command word, such as command word 402 in FIG. 4. Entry 504 illustrates an e-field word, such as e-field word 404 in FIG. 4. The entries in section 506 illustrate the type of data that may be found in data words, such as data words 402–410 in FIG. 4. Although a particular format and type of data are illustrated in table 500 for a vertex data stream, this illustration is merely exemplary and not intended as an architectural limitation to the type of data that may be processed by the present invention. For example, the e-field in entry 502 contains 32 bits. This e-field may contain additional bits or fewer bits depending on the architecture of the geometry engine.

Figure 6:
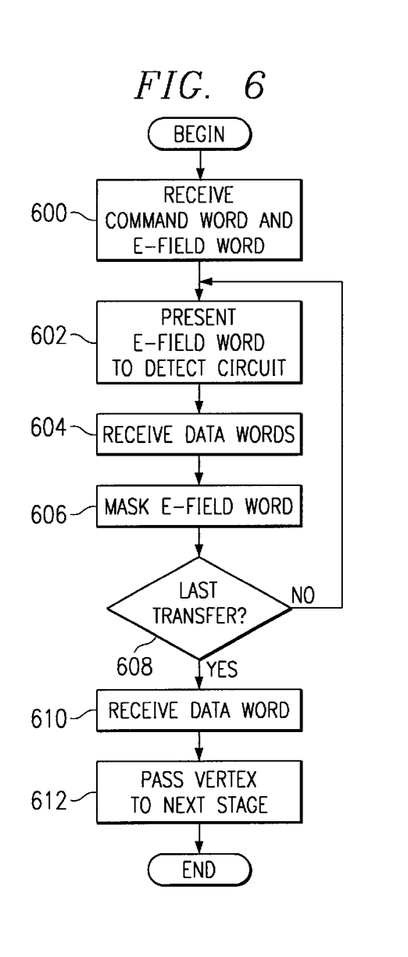
FIG. 6 is a flowchart of a process detecting whether all of the data for a vertex has been received in accordance with a preferred embodiment of the present invention.

Turning to FIG. 6, a flowchart of a process for detecting whether all of the data for a vertex has been received is depicted in accordance with a preferred embodiment of the present invention. The process begins by receiving a command word and an e-field word (step 600). The e-field word is presented to the detect circuit (step 602). The detect circuit performs encoding to generate a one bit result, which indicates whether two or more bits are set in the e-field word. The process then receives the data words (step 604). In this example, the data words are received two words at a time. The e-field word is then masked (step 606). The masking of the e-field word, in this example, involves setting two of the bits from a one to a zero. A determination is made as to whether a last transfer of data words has occurred (step 608). In this example, if a logic one is received from the detect circuit then two bits or less are set in the e-field word. This indicates that the last data transfer will occur with the receipt of the next two words. If the detect circuit indicates that the last transfer will occur in the next cycle, these data words are received (step 610). The process then passes the completed vertex to the next stage for processing (step 612) with the process terminating thereafter.

Referring back to step 608, if the last data transfer is not about to occur, the process then returns to step 602 as described above.

Figure 7:
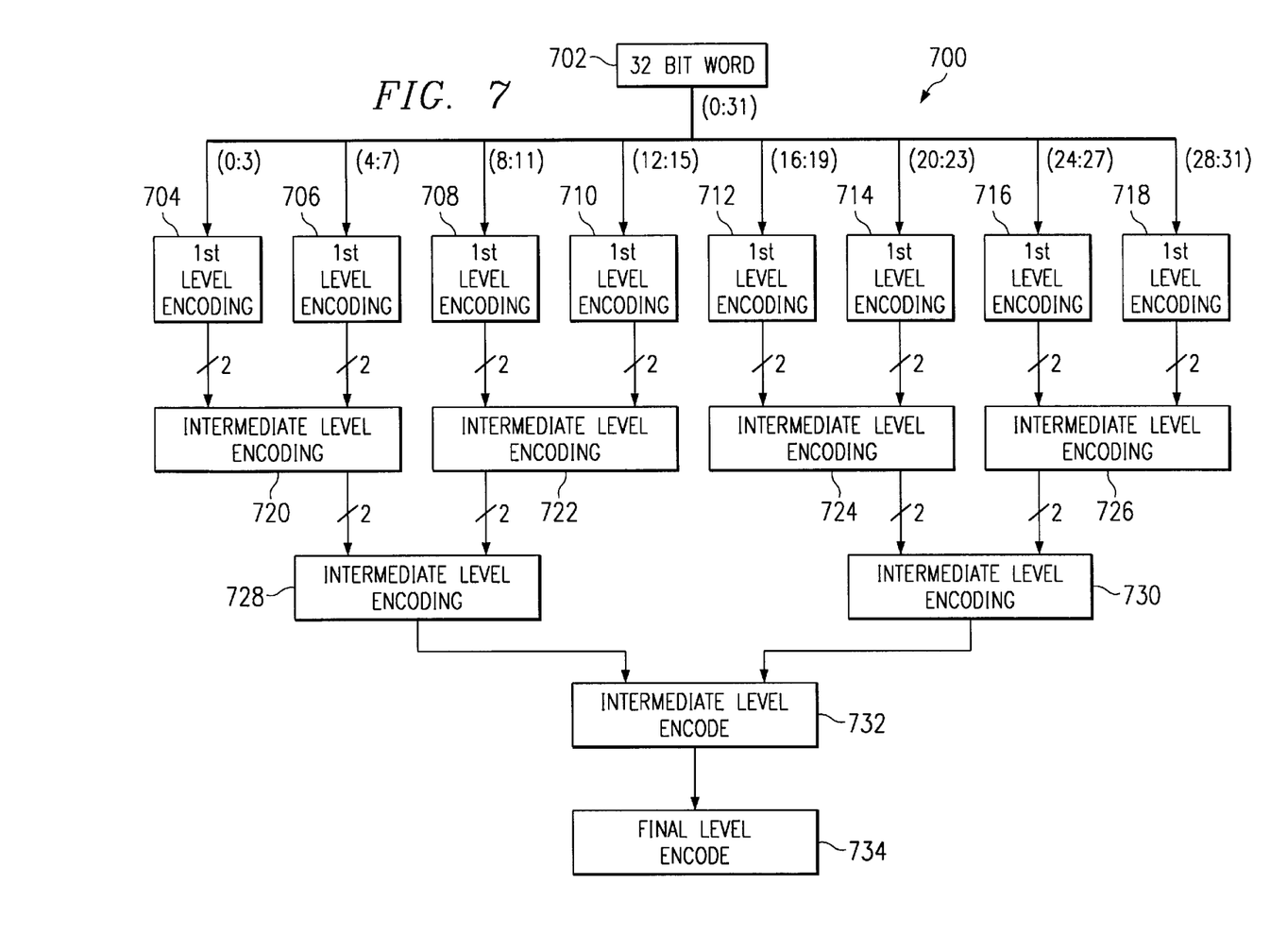
FIG. 7 is a block diagram illustrating components in a detect circuit Grammatically correct Stylistic change in accordance with a preferred embodiment of the present invention.

Turning now to FIG. 7, a block diagram illustrating components in a detect circuit is depicted in accordance with a preferred embodiment of the present invention. Decode circuit 700 is an illustration of a decode circuit used to determine whether two or more bits are set in a 32 bit word without using a counter. In this example, decode circuit 700 receives 32 bit word 702 for processing. 32 bit word 702 is an e-field word containing bits that are set to indicate the number of data words that are to be received for a vertex. Each time a pair of data words is received, 32 bit word 702 is masked to reflect the receipt of these data words. In essence, 32 bit word 702 will have two bits masked off each cycle with the word being presented to detect circuit 700 each cycle. 32 bit word 702 is then presented to detect circuit 700 for encoding.

The bits within 32 bit word 702 are grouped into 8 groups of 4 bits and sent to first level encoding units 704–718. The output of each of these first level encoding units is in the form of a two bit code. These two bit codes are sent to intermediate level encoding units 720–726. Each intermediate level encoding unit receives a pair of two bit codes from two first level encoding units. Each of these intermediate level encoding units generate a two bit code as an output. These results are sent to intermediate level encoding units 728 and 730, which perform similar encoding processes to generate a two bit code output each. The two bit outputs from intermediate encoding units 728 and 730 are sent to intermediate level encoding unit 732, which generates a two bit output from the four bits received from intermediate level encoding units 728 and 730.

Final level encoding unit 734 receives the two bit code output from intermediate level encoding unit 732 Final level encoding unit 734 encodes these two bit codes to generate a single bit result , which indicates whether the last transfer or data reception cycle is to occur.

Decoding circuit 700 is an exemplary decoding circuit for the present invention. In this example eight first level encoding units, six intermediate level encoding units, and one final level encoding unit are used in decoding circuit 700. If the data structure present to decoding circuit 702 is larger or smaller than 32 bit word 702, different numbers of first level encoding circuits and different numbers of intermediate levels of encoding circuits may be required. In this example, two stages of intermediate level encoding units are used in decode circuit 700. If more than 32 bits are to be presented to the decoding circuit, then additional levels of intermediate encoding will be present prior to final encoding level 734.

Figure 8:
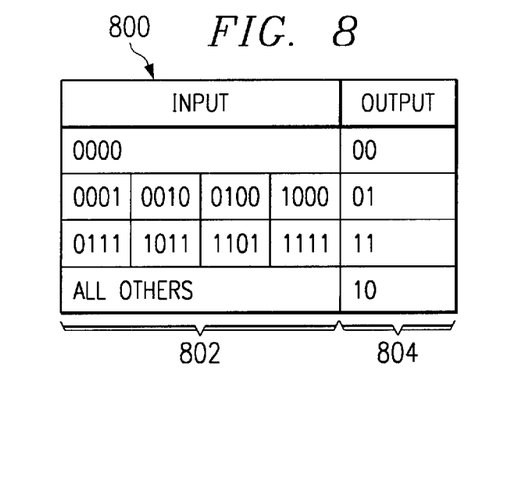
FIG. 8 is a table illustrating decoding in a first level encoding unit in accordance with a preferred embodiment with the present invention.

Turning next to FIG. 8, a table illustrating decoding in a first level encoding unit is depicted in accordance with a preferred embodiment with the present invention. Table 800 includes an input section 802 and a resulting output section 804 for a first level encoding unit, such first level encoding unit 704 in FIG. 7. The first level encoding takes a group of four bits from the input word and produces a code to indicate whether zero bits, one bit, two bits, or more than two bits are set in the group of four bits. For example, if the group of four bits is 0000, then the corresponding output is 00. If the input is one of the following: 0001, 0010, 0100, or 1000, then the output is 01. An output of 11 is generated if one of the following is input into the first level encoding circuit: 0111, 1011, 1101, or 1111. Any other input results in a 10 as the output.

Figure 9:
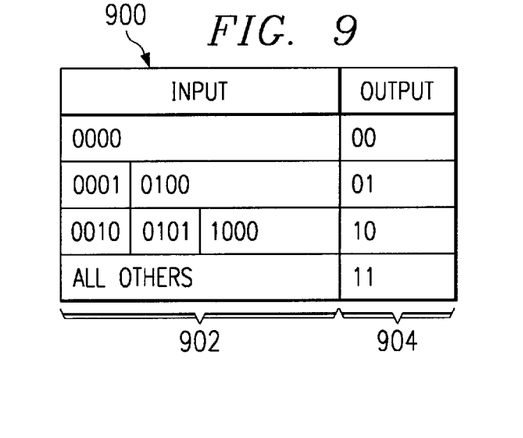
FIG. 9 is a table illustrating decoding in an intermediate level encoding unit in accordance with a preferred embodiment of the present invention.

Turning now to FIG. 9, a table illustrating decoding in an intermediate level encoding unit is depicted in accordance with a preferred embodiment of the present invention. Table 900 includes an input section 902 and an output section 904, which illustrates the encoding performed by an intermediate level encoding unit, such as intermediate level encoding unit 720 in FIG. 7. In intermediate level encoding, the output generated by two previous encoders is received and processed to generate another two bit code to indicate whether zero bits, one bit, two bits, or more than two bits are set in the group of four bits received from the prior encoding units. An output of 00 is generated if the inputs into the intermediate level encoding unit is 0000. If a 0001 or a 0100 is received, an output of 01 is generated. An output of 10 is generated if one of the following inputs is received by the intermediate level encoding unit: 0010, 0101, or 1000. Any other input results in the generation of a 11 as the two bit code output by the intermediate level encoding unit.

Figure 10:
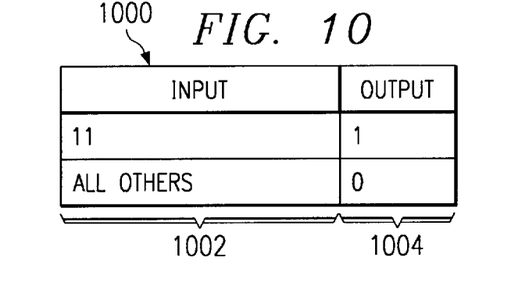
FIG. 10 is a table illustrating encoding performed by a final level encoding unit in accordance with a preferred embodiment of the present invention.

Next, FIG. 10 depicts a table illustrating encoding performed by a final level encoding unit in accordance with a preferred embodiment of the present invention. Table 1000 includes an input section 1002 and an output section 1004, which illustrates encoding performed by a final level encoding unit, such as final level encoding unit 734 in FIG. 7. If the input into the final level encoding unit is an 11, then a 1 is generated by the final level encoding unit. Any other input results in an output of 0 from the final level encoding unit.

If the results of the final level encoding unit is a zero, then this result indicates that the last transfer or data cycle will occur for the vertex.

In terms of clock cycles used in decode circuit 700, the first clock cycle includes: (a) receiving the command and e-field words; (b) sending the e-field word through the detect circuit and saving the results in a latch for the next clock cycle; and (c) masking the e-field word and storing the masked e-field in a latch for the next clock cycle. In the second (nth) clock cycle, the following occurs: (a) receiving data words; (b) passing the masked e-field word from the previous cycle through the detect circuit and saving the results for the next clock cycle; and (c) masking the masked e-field word from the previous clock cycle again and storing the e-field word for the next clock cycle. The second (nth) clock cycle is repeated until the results from the detect circuit from cycle n-1 indicates this is the last data transfer.

Thus, the present invention provides a mechanism for determining when a variable length data stream is complete for a vertex. This mechanism forms this identification without using a counter and detects when there are two or fewer bits set in a 32 bit word. The word containing the enable bits are grouped into 8 groups of 4 bits and encoded as described above to generate a two bit code for each group to indicate whether zero, one, two, or more than two bits are set. These two bit codes are assembled into four groups of four bits and encoded again to generate a two bit code for each group. These two bit codes are assembled into two groups of four bits and encoded again to produce two groups of two bits. These four bits are encoded into a two bit code, which is then use to generate a single bit to indicate whether two or less bits are set or more than two bits are set in the word. In this manner, identification of whether additional data words are to be received may be made without decreasing the performance in the geometry engine.

The description of the present invention has been presented for purposes of illustration and description, and is not intended to be exhaustive or limited to the invention in the form disclosed. Many modifications and variations will be apparent to those of ordinary skill in the art. For example, the mechanism of the present invention may be applied to processing data structures having a different size than a 32 bit word. Different numbers of encoders and different number encoding stages may be used depending on the size of the data structure. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining, without using a counter, when all data in a variable length data stream has been received, the method comprising the data processing system implemented steps of:

receiving an indicator that indicates a length of said variable length data stream;

receiving data from said variable length data stream;

repeatedly encoding said indicator until a single bit output result is obtained that indicates whether additional data in said data stream is still to be received, said single bit output result being obtained by encoding and not through the use of a counter;

determining whether all data in said variable length data stream has been received utilizing said single bit output result, wherein said determination of whether all of the data has been received is made without using a counter;

in response to a determination that all of the data has not been received, masking said indicator in order to produce a second indicator that indicates a length of remaining data in said data stream that is still to be received, wherein said masking does not include incrementing of decrementing said indicator; and repeatedly encoding said second indicator until a second single bit output result is obtained that indicates whether additional data in said data stream remains to be received.

2. The method of claim 1, further comprising the steps of:

receiving said indicator including bits;

dividing the bits into a plurality of bit groups;

said repeatedly encoding said indicator including encoding each bit group in the plurality of bit groups to generate a set of resulting bits from each bit group, wherein the resulting bits are fewer in number than the bits included in a bit group used to generate the resulting bits; segregating the resulting bits from all of said plurality of bit groups into another set of bit groups; and repeating the encoding and segregating steps until said single bit output result is generated from the encoding step;

wherein the indicator includes a logic one for each portion of said data stream that remains to be received by the data processing system and wherein a logic zero in the single bit output result indicates that all of said data stream has been received.

3. The method of claim 1 further comprising:

determining whether all of the data has been received using the single bit output result;

responsive to an absence of a determination that all of the data has been received, receiving additional data; and masking off bits included within the indicator in response to receiving the additional data.

4. The method of claim 1, wherein the indicator is a 32 bit word.

5. The method of claim 1, wherein the receiving, and encoding steps are performed in a circuit.

6. An apparatus for determining, without using a counter, when all data in a variable length data stream has been received, the apparatus comprising:

a detect circuit for receiving an indicator of a length of said variable length data stream, said detect circuit for receiving data from said variable length data stream;

a plurality of encoding stages for repeatedly encoding said indicator until a single bit output result is obtained that indicates whether additional data in said data stream is still to be received, said single bit output result being obtained by encoding and not through the use of a counter;

said single bit output result being utilized to determine whether all data in said variable length data stream has been received, wherein said determination of whether all of the data has been received is made without using a counter; and in response to a determination that all of the data has not been received, said detect circuit for masking said indicator in order to produce a second indicator that indicates a new length of remaining data in said data stream that is still to be received, wherein said masking does not include incrementing of decrementing said indicator; and said plurality of encoding stages for repeatedly encoding said second indicator until a second single bit output result is obtained that indicates whether additional data in said data stream is still to be received.

7. The apparatus of claim 6, further comprising:

said plurality of encoding stages including:

a first level encoding stage, wherein the first level encoding stage receives said indicator including bit, divides the bits into a set of bit groups, and encodes the set of bit groups to form a set of output bits;

a set of intermediate level encoding stages connected to the first level encoding stage, wherein each intermediate level encoding stage receives the set of output bits from a previous stage, groups the set of output bits into a plurality of bit groups, and encodes the plurality of bit groups to generate a second plurality of output bits; and a final level encoding stage connected to a last intermediate level encoding stage within the set of intermediate level encoding stages, wherein the final level encoding stage received the second plurality of output bits, and encodes the second plurality of output bits to generate said single bit output result;

wherein said first level encoding stage includes:

a plurality of encoders, wherein each encoder within the plurality of encoders receives a bit group from the set of bit groups and generate a set of output bits based on the contents of the bit group.

8. The apparatus of claim 6, wherein each level of intermediate encoding stage includes:

a plurality of encoders, wherein each encoder within the plurality of encoders receives a bit group from the plurality of bit groups and generates a second plurality of output bits based on the contents of the bit group.

9. The apparatus of claim 6, wherein the final level encoding stage includes:

an encoder, wherein the encoder receives the second plurality of output bits and generates said single bit output result.

10. The apparatus of claim 6, wherein the indicator includes a logic one to indicate that data remains in said data stream is to be received and wherein the single bit output result indicates whether additional data is to be received.

11. The apparatus of claim 6, wherein the indicator is a 32 bit word.

12. A graphics pipeline comprising:

an input, wherein the input receives graphics data;

an output, wherein the output transmits processed graphics data; and a detect circuit including a plurality of stages, wherein a first stage within the plurality of stages is connected to the input and a last stage within the plurality of stages is connected to the output, wherein the first stage of said detect circuit has a plurality of modes of operation including:

a first mode of operation in which an indicator of a length of a variable length data stream is received, the indicator containing bits;

a second mode of operation in which the bits are grouped into a plurality of bit groups;

a third mode of operation in which each bit group in the plurality of groups is encoded to generate a set of resulting bits, wherein the resulting bits are fewer in number than the bits in a bit group within the plurality of bit groups;

a fourth mode of operation in which the resulting bits are grouped into another set of bit groups; and a fifth mode of operation for causing the detect circuit to cycle through the third mode of operation and the fourth mode of operation until a single bit output result is generated; the single bit output result being used to determine whether all data in the variable length data stream has been received, said single bit output result being obtained by encoding and not through the use of a counter, wherein said determination of whether all of the data has been received is made without using a counter; and in response to a determination that all of the data has not been received, the fifth mode of operation for masking said indicator in order to produce a second indicator that indicates a new length of remaining data in said data stream that is still to be received, wherein said masking does not include incrementing or decrementing said indicator; and said fifth mode of operation for repeatedly encoding said second indicator until a second single bit output result is obtained that indicates whether additional data in said data stream is still to be received.

13. The graphics pipeline of claim 12, wherein the indicator data is a 32 bit word.

14. The graphics pipeline of claim 12, wherein the first stage is a vertex packer unit.

15. The graphics pipeline of claim 12, wherein the data stream is a data stream for generating a vertex, and wherein the detect circuit is activated each time data for the vertex is received by the first stage and wherein the first stage holds received data until single bit output result indicates that all data for the vertex has been received.

16. A data processing system for determining, without using a counter, when all data in a variable length data stream has been received, the data processing system comprising:

receiving means for receiving an indicator of a length of said variable length data stream;

receiving means for receiving data from said variable length data stream;

encoding means for repeatedly encoding said indicator until a single bit output result is obtained that indicates whether additional data in said data stream is still to be received, said single bit output result being obtained by encoding and not through the use of a counter;

determining means for determining whether all data in said variable length data stream has been received utilizing said single bit output result, wherein said determination of whether all of the data has been received is made without using a counter; and in response to a determination that all of the data has not been received, masking means for masking said indicator in order to produce a second indicator that indicator a second length of remaining data in said data stream that is still to be received, wherein said masking does not include incrementing of decrementing said indicator; and said encoding means for repeatedly encoding said second indicator until a second single bit output result is obtained that indicates whether additional data in said data stream is still to be received.

17. The data processing system of claim 16, further comprising:

received means for receiving said indicator including bits;

dividing means for dividing the bits into a plurality of bit groups;

said encoding means for repeatedly encoding said indicator including encoding means for encoding each bit group in the plurality of bit groups to generate a set of resulting bits from each bit group, wherein the resulting bits are fewer in number than the bits included in a bit group used to generate the resulting bits; segregating means for segregating the resulting bits from all of said plurality of bit groups into another set of bit groups; and repeating means for repeating the encoding and segregating steps until said single bit output result is generated from the encoding step;

wherein the indicator includes a logic one for each portion of said data stream that remains to be received by the data processing system and wherein a logic zero in the single bit output result indicates that all of said data stream data has been received.

18. The data processing system of claim 16 further comprising:

determining means for determining whether all of the data has been received using the single bit output result;

receiving means, responsive to an absence of a determination that all of the data has been received, for receiving additional data; and masking means for masking off bits included within the indicator data struct in response to receiving the additional data.

19. The data processing system of claim 16, wherein the indicator is a 32 bit word.

20. The data processing system of claim 16, wherein the receiving means, and encoding means are performed in a circuit.

* * * * *

UNITED STATES PATENT AND TRADEMARK OFFICE
CERTIFICATE OF CORRECTION

PATENT NO. : 6,664,967 B1
DATED : December 16, 2003
INVENTOR(S) : Cook

It is certified that error appears in the above-identified patent and that said Letters Patent is hereby corrected as shown below:

Column 2,
Line 54, after "depicts a" delete "is".

Column 4,
Line 64, after "portion of a" delete "tprimitive" and insert -- primitive --.

Column 8,
Line 49, after "incrementing" delete "of" and insert -- or --.

Column 9,
Line 39, after "incrementing" delete "of" and insert -- or --.
Line 48, after "including" delete "bit" and insert -- bits --.
Line 61, after "stage" delete "received" and insert -- receives --.

Column 10,
Line 1, after "groups and" delete "generate" and insert -- generates --.
Lines 3 and 9, after "claim" delete "6" and insert -- 7 --.
Line 16, after "stream" delete "is".
Line 64, after "indicator" delete "data".

Column 11,
Line 5, after "until" insert -- the --.
Lines 27-28, after "that" delete "indicator" and insert -- indicates --.
Line 30, after "incrementing" delete "of" and insert -- or --.

Column 12,
Line 1, before "means" delete "received" and insert -- receiving --.
Line 19, after "stream" delete "data".

UNITED STATES PATENT AND TRADEMARK OFFICE
CERTIFICATE OF CORRECTION

PATENT NO.   : 6,664,967 B1
DATED        : December 16, 2003
INVENTOR(S)  : Cook It is certified that error appears in the above-identified patent and that said Letters Patent is hereby corrected as shown below:

<u>Column 12 (cont'd),</u>
Line 28, after "indicator" delete "data struct".

Signed and Sealed this

Third Day of January, 2006

JON W. DUDAS
*Director of the United States Patent and Trademark Office*